United States Patent [19]

Klipper et al.

[11] Patent Number: 4,952,608
[45] Date of Patent: Aug. 28, 1990

[54] PROCESS FOR PREPARING SYNTHETIC RESINS HAVING ANION EXCHANGER PROPERTIES BY AMIDOMETHYLATING A BACKBONE POLYMER CONTAINING AROMATIC NUCLEI WITH A SPECIALLY PREPARED N-HYDROXYMETHYL PHTHALIMIDE

[75] Inventors: Reinhold M. Klipper, Cologne; Peter M. Lange, Leverkusen, both of Fed. Rep. of Germany

[73] Assignee: Bayer Aktiengesellschyaft, Leverkusen, Fed. Rep. of Germany

[21] Appl. No.: 244,441

[22] Filed: Sep. 14, 1988

[30] Foreign Application Priority Data

Sep. 30, 1987 [DE] Fed. Rep. of Germany ....... 3733033

[51] Int. Cl.$^5$ ............................ C08F 5/20; C08F 8/30; C08C 19/22
[52] U.S. Cl. ....................................... 521/32; 525/375
[58] Field of Search .................. 548/478, 470; 521/32, 521/30

[56] References Cited

U.S. PATENT DOCUMENTS

| | | | |
|---|---|---|---|
| 3,767,671 | 10/1973 | Klebe et al. | 548/478 |
| 3,882,053 | 5/1975 | Corte et al. | 521/32 |
| 3,925,264 | 12/1975 | Corte et al. | 521/33 |
| 4,077,918 | 3/1978 | Corte et al. | 521/32 |

OTHER PUBLICATIONS

J. Eng. Chem. vol. 37, No. 3, 1972 pp. 391–394.

Primary Examiner—Joseph L. Schoffer
Assistant Examiner—Peter F. Kulkosky
Attorney, Agent, or Firm—Sprung Horn Kramer & Woods

[57] ABSTRACT

The invention relates to a process for preparing anion exchangers based on crosslinked, water-insoluble organic polymers containing aromatic nuclei, in which, in the first step, N-hydroxymethylphthalimide is produced by reaction of phthalimide with aqueous formaldehyde solution in swelling agents in the presence of bases; if desired, this N-hydroxymethylphthalimide is converted in a 2nd step to the bis)phthalimidomethyl)ether or an ester of N-hydroxymethylphthalimide; said polymers are aminomethylated wtih N-hydroxy-methylphthalimide, bis)phthalimidomethyl) ether or an ester of N-hydroxymethylphthalimide in the presence of Friedel-Craft catalysts and swelling agents and the amidomethylated polymers are finally saponified to form the aminomethylated polymers, wherein, in the first reaction step, the base used for producing N-hy-droxymethylphthalimide is sodium hydroxide solution and this sodium hydroxide solution is added in such an amount and at such a rate that the reaction of phthalimide with formaldehyde takes place in the pH range of 5 to 6.

7 Claims, No Drawings

PROCESS FOR PREPARING SYNTHETIC RESINS HAVING ANION EXCHANGER PROPERTIES BY AMIDOMETHYLATING A BACKBONE POLYMER CONTAINING AROMATIC NUCLEI WITH A SPECIALLY PREPARED N-HYDROXYMETHYL PHTHALIMIDE

The invention relates to a novel process for preparing anion exchangers based on crosslinked, water-insoluble organic polymers containing aromatic nuclei.

It is known to prepare anion exchangers based on crosslinked, water-insoluble organic polymers containing aromatic nuclei, for example, by amidoalkylation of said polymers in the presence of swelling agents and Friedel-Craft catalysts and subsequent hydrolysis of the amidoalkylated polymers. The proposed amidoalkylation agents were N-haloalkylimides (see U.S. Pat. No. 3,006,866), N-haloalkylimides (see U.S. Pat. No. 3,925,264), ester of N-hydroxyalkylimides (see U.S. Pat. No. 3,989,650) and bis(dicarboximidoalkyl) ethers (see U.S. Pat. Nos. 3,882,053 and 4,077,918).

Amidomethylating agent such as N-hydroxymethylphthalimide, the esters of N-hydroxymethylphthalimide and of bis(phthalimidomethyl) ethers were mentioned as preferred.

The starting product for preparing these preferred amidomethylating agents is N-hydroxymethylphthalimide. This N-hydroxymethylphthalimide is produced in the first step of the preparation of anion exchangers by reaction of phthalimide with formaldehyde in swelling agents with the addition of small amounts of zinc oxide (see U.S. Pat. No. 3,925,264, Example 1) or sodium carbonate (see U.S. Pat. Nos. 3,925,264, Example 12 and 4,077,918, Example 1).

For uses other than the preparation of anion exchangers, N-hydroxymethylphthalimide is conventionally prepared by reaction of phthalimide with formaldehyde in aqueous solution using sodium carbonate or sodium hydroxide as basic condensation agents (see, for example, Org. Reactions 14, page 130 and J. Org. Chem. Vol. 37 (1972), pages 391–393). Surprisingly, it has been found that anion exchangers based on crosslinked, water-insoluble organic polymers containing aromatic nuclei and having an improved total capacity and in particular improved mechanical and osmotic stability are obtained and, in addition, the time for the preparation of the anion exchangers is substantially reduced, that is the space-time yields of the preparative processes can be substantially increased, if in the reaction of phthalimide and formaldehyde in the swelling agent sodium hydroxide solution is used as the basic condensation agent and, in addition, the reaction is carried out within a specific pH range.

Although it was known to use sodium hydroxide as the condensation agent in the preparation of N-hydroxymethyl phthalimide in aqueous solutions, the replacement of sodium carbonate by sodium hydroxide in the preparation of N-hydroxymethylphthalimide to be used as amidoalkylating agent for organic polymers, that is in the preparation of N-hydroxymethylphthalimide in swelling agents, was in no way obvious, since sodium carbonate and sodium hydroxide are used in the reactions of phthalimide and formaldehyde in aqueous solutions as equivalent condensation agents. Therefore, there were no grounds for assuming that the replacement of sodium carbonate solution by sodium hydroxide solution in the preparation of N-hydroxyphthalimide in swelling agents could have any advantage, in particular it was not to be expected that the use of sodium hydroxide solution in the first process step of the preparative process could lead to an improvement in the stability of the finished anion exchangers.

Therefore, the invention relates to a process for preparing anion exchangers based on crosslinked, water-insoluble organic polymers containing aromatic nuclei, in which, in the first step, N-hydroxymethylphthalimide is produced by reaction of phthalimide with aqueous formaldehyde solution in swelling agents in the presence of bases; if desired, this N-hydroxymethylphthalimide is converted in a second step to the bis(phthalimidomethyl) ether or an ester of N-hydroxymethylphthalimide; said polymers are amidomethylated by amidomethylation with N-hydroxymethylphthalimide, with esters of N-hydroxymethylphthalimide or with bis(phthalimidomethyl) ether in the presence of Friedel-Craft catalysts and swelling agents and the amidomethylated polymers are finally saponified to form the aminomethylated polymers, characterized in that, in the first reaction step, the base used for producing N-hydroxymethylphthalimide is sodium hydroxide solution and this sodium hydroxide solution is added in such an amount and at such a rate that in the reaction mixture a pH value is maintained in the range of 5 to 6.

The measure according to the invention of reacting phthalimide and formaldehyde in the pH range of 5 to 6 and adjusting and maintaining this range by adding sodium hydroxide solution brings about the following important advantages compared to the previously described processes in which zinc oxide and sodium carbonate are used as bases and in which a specific pH was neither adjusted nor maintained in the reaction solutions:

1. The formation of emulsions which occurs in the 2-phase system swelling agent/water if sodium carbonate is used is avoided. The organic phase containing the N-hydroxymethylphthalimide separates rapidly and without difficulties from the aqueous phase.

2. The conversion of the N-hydroxymethylphthalimide contained in the swelling agent, that is in the organic phase, to the esters or to the bis(phthalimidomethyl) ether proceeds considerably faster.

3. The anion exchangers are obtained in a calculable, constant and improved basicity yield (basicity yield=volume of the anion exchanger×total capacity of the anion exchanger; total capacity=val of amino groups/l of anion exchanger).

4. The anion exchangers have an improved mechanical and osmotic stability.

The process according to the invention can in general be carried out as follows:

Phthalimide and 20–40% strength aqueous formaldehyde solution (molar ratio of phthalimide:formaldehyde about 1:1–1.5) are introduced into the swelling agent (amount of swelling agent: approximately 3–6 parts by weight per part by weight of phthalimide). The suspension obtained in this manner is heated to temperatures from 60° to 80° C. with stirring and adjusted to a pH of 5–6 by adding 20 to 50% strength aqueous sodium hydroxide solution and maintained during the reaction in this range, if necessary by addition of more sodium hydroxide solution. The pH is determined by means of an electrode immersed in the agitated suspension. The end of the reaction can be recognized by the conversion of the suspension to a cloudy solution. The stirrer is switched off to allow separation of the phases. The organic bottom layer containing the N-hydroxymethylphthalimide is separated off and dried.

The solution of N-hydroxymethylphthalimide in the swelling agent obtained in this manner is either used directly for the amidomethylation of the crosslinked, water-insoluble organic polymers containing aromatic nuclei or alternatively, the N-hydroxymethylphthalimide is first converted to the bis(phthalimidomethyl) ether or to an ester and the ether or the ester is used for the amidoalkylation reaction. The amidomethylation of the organic polymers using the solution of the N-hydroxymethylphthalimide, the bis(phthalimidomethyl) ether or the esters of N-hydroxymethylphthalimide in the swelling agents is carried out in a manner known per se, for example by the methods described in U.S. Pat. Nos. 3,925,264, 3,882,053, 4,077,918 and 3,989,650.

The amidomethylation of the organic polymers may be illustrated by means of the amidomethylation using the bis(phthalimidomethyl) ether (A) and by means of the amidomethylation using the ester of acetic acid with N-hydroxymethylphthalimide (B):

A. To the solution of N-hydroxymethylphthalimide in the swelling agent obtained in the first process step are added catalytic amounts of sulphuric acid (0.07 mole of $H_2SO_4$ per mole of N-hydroxymethylphthalimide), the solution is heated to the reflux temperature with stirring and stirred at this temperature until the ether formation is completed (the course of the ether formation is monitored by chromatography; the yield of ether is approximately quantitative). The suspension present after the completion of ether formation is cooled to about room temperature and the Friedel-Craft catalyst intended for the amidomethylation, for example iron(III) chloride, tin tetrachloride or, preferably, sulphur trioxide is added. The polymer to be amidomethylated is introduced into this mixture (amount of polymer: ratio of mole of aromatic nuclei contained in the polymer:bis(phthalimidomethyl) ether = 1:0.5–4, preferably 1:0.75–2.5). The reaction mixture is heated to temperatures from 65° to 80° C. with stirring and then stirred at this temperature for 18 hours. After cooling to room temperature, the phthalimido methylated polymer is separated off from the liquid phase (the swelling agent), taken up in deionized water and freed of adherent swelling agent by azeotropic distillation. Finally, the phthalimidomethylated polymer is saponified in a known manner, for example by alkaline or acid hydrolysis or by reaction with hydrazine and subsequent acid hydrolysis in the presence or absence of an organic solvent; this organic solvent can be, for example, the swelling agent used for the amidomethylation.

B. The amidomethylation with esters of N-hydroxymethylphthalimide, for example the ester of acetic acid, is carried out by admixing the dried solution of N-hydroxymethylphthalimide in the swelling agent used which had been obtained in the first process step with the amount of acetic anhydride necessary for the esterification and heating the mixture to the reflux temperature with stirring until ester formation is complete (the course of ester formation is monitored by chromatography; the yield of ester is virtually quantitative). After esterification is complete, the solution is cooled to 20° to 50° C., and the organic polymer to be amidomethylated is introduced with stirring (amount of polymer: ratio of moles of aromatic nuclei in the polymer: mole of ester = 1:0.5–4, preferably 1:1–2.5). The polymer is swollen in the ester solution at 50° to 70° C. for 0.5–2 hours. The suspension is then heated to the reflux temperature, and the proposed Friedel-Craft catalyst, preferably sulphuric acid, is added, and the suspension is subsequently stirred for 20 hours at the reflux temperature.

The workup of the reaction mixture and the hydrolysis of the phthalimidomethylated polymer is carried out as described under A.

The swelling agents used in the process according to the invention are in particular halogenated hydrocarbons such as carbon tetrachloride, dichloroethane, trichloroethylene, symmetrical tetrachloroethane, 1,1,2-trichloroethane, tetrachloroethylene, dichloropropane, pentachloroethane, trichloropropanes and tetrachloropropanes; preferably, 1,2-dichloroethane is used.

Suitable crosslinked, water-insoluble organic polymers containing aromatic nuclei are preferably vinyl aromatic compounds which are obtained, for example, in the mixed polymerization of mono- and polyvinyl compounds. Such mixed polymers are known and are obtained in a known manner. The mixed polymers can have a gel-like structure or can be macroporous. Preference is given to those customary mixed polymers which are composed of a predominant proportion of monovinyl aromatic compounds and a small proportion of aromatic or aliphatic polyvinyl compounds. The percentage amount of polyvinyl compounds acting as crosslinking agents can vary within wide limits. In the case of mixed polymers having a gel-like structure, amounts of 0.5 to 20% by weight of polyvinyl compounds, preferably 0.5 to 10% by weight are usually used, whereas in the case of macroporous mixed polymers amounts from 2 to 50% by weight of polyvinyl compounds, preferably 2 to 20% by weight, based on the total weight of the monomers, are used.

Customary monovinyl aromatic compounds which may be mentioned are for example: vinylnaphthalene, optionally substituted styrenes such as vinyltoluene, vinylanisole and ethylstyrene; styrene is preferred.

Customary polyvinyl compounds which may be mentioned are for example: divinyl ether, divinylpyridine, divinyl toluenes, divinyl naphthalenes, ethylene glycol diacrylate, divinyl xylene, divinylethylbenzene, divinyl sulphone, polyvinyl or polyallyl ethers of glycol, glycerol and pentaerythritol, divinyl ketone, divinyl sulphide, N,N'-methylenediacrylamide, N,N'-methylenedimethacrylamide, N,N'-ethylenediacrylamide, 1,2-di-(α-methylmethylenesulphonamido)ethylene, trivinylbenzene, trivinylnaphthalene, polyvinylanthracenes and trivinylcyclohexane; divinylbenzene and ethylene glycol dimethacrylate are preferred. In addition, crosslinked vinyl aromatic mixed polymers can be used in whose preparation known additives of other vinyl compounds were used such as methacrylic and acrylic compounds. However, for the preparation of anion exchanger synthetic resins, only mixed polymers which contain the additives mentioned in an amount up to about 10% by weight, based on the total weight of the monomers are in general of interest.

The bead polymers A, B and C used in the Examples below are the following mixed polymers:

Polymer A

Bead polymer made of macroporous polystyrene crosslinked with 5% by weight of divinylbenzene.

Polymer B

Bead polymer made of macroporous polystyrene crosslinked with 6% by weight of divinylbenzene.

Polymer C

Bead polymer made of macroporous polystyrene crosslinked with 8% by weight of divinylbenzene.

The mechanical and osmotic stability of the amino methylated bead polymers (anion exchangers) obtained in the Examples below were determined using the following test methods:

(a) Determination of mechanical stability (roll test):

The bead polymer to be tested is distributed between two plastic cloths in a layer of uniform thickness. The cloths are placed on a firm horizontally arranged base and subjected to 20 cycles in a roll apparatus. One cycle consists of one rolling carried out forwards and backwards. After rolling, representative samples are used to determine the number of undamaged (whole) beads, of fragmented beads and also of the fragments by counting under the microscope.

(b) Determination of the osmotic stability (swelling stability):

In a glass tube 50 ml of the polymer to be tested are subjected 30 times to a charging cycle each lasting for 1 hour. The charging cycle consists of the following sub-steps: charging with 0.5N hydrochloric acid, rinsing with deionized water, charging with 0.5N sodium hydroxide solution, rinsing with deionized water. Representative samples ae then used to determine the number of undamaged (whole) beads, of fragmented beads and of the fragments by counting under the microscope.

EXAMPLE 1 a. 200.4 g of phthalimide, 135.9 g (36.4% strength by weight) of formalin solution and 890.6 g of 1,2-dichloroethane are mixed together in a flask at room temperature and heated to the reflux temperature. The pH of the mixture is then adjusted to a value of 5.5 to 6.0 by the dropwise addition of 45% strength by weight of sodium hydroxide solution and maintained in this range during the reaction (the pH of the reaction mixture is determined by means of a glass electrode immersed in the stirred mixture). After about 5 to 10 minutes, a cloudy solution is formed which immediately separates into two layers after the stirrer is switched off. The bottom layer, the solution of N-hydroxymethylphthalimide in dichloroethane, is separated off and dried.

b. 10.4 g (98% strength) of sulphuric acid is added to the dried solution of N-hydroxymethylphthalimide in dichloroethane obtained in step a., and the mixture is stirred for 1.5 hours at the reflux temperature. (Yield of bis(phthalimidomethyl) ether: 91.5% of theory). The suspension obtained is cooled to 25° to 30° C., and 72 g (65% strength) of oleum are added. 138.4 g of polymer A (particle size: 0.3 to 0.8 mm) are then introduced into the suspension at 30° to 40° C. The reaction mixture is stirred for 30 minutes, then heated to 70° C. with stirring and stirred at this temperature for a further 18 hours. The hot, liquid phase is separated off, the resin is taken up in deionized water and freed of adherent dichloroloroethane by azeotropic distillation. Yield: 600 ml c. The 600 ml of phthalimidomethylated polymer from step b. are introduced into 1280 ml of 27% strength by weight of sodium hydroxide solution and stirred in an autoclave for 8 hours at 180° C. The amino-methylated polymer formed is washed with water. Yield: 437 ml

Comparative Examples $\alpha$, $\beta$, and $\gamma$

In the Comparative Examples $\alpha$, $\beta$, and $\gamma$, the reaction was carried out as described above under a.–c., with the only difference that in step a. the pH of the reaction mixture was not adjusted to and maintained at 5.5–6.0 by adding sodium hydroxide solution, but—as customary up to now—a defined amount of sodium carbonate was added once at the start of the reaction of phthalimide/formaldehyde; namely in Comparative Example $\alpha$ 2.25 g of sodium carbonate in Comparative Example $\beta$ 10.4 g of sodium carbonate and in Comparative Example $\gamma$ 25 g of sodium carbonate.

In the Table following the Examples, the required time for the formation of bis(phthalimidomethyl) ether, the yields of amidomethylated bead polymer and aminomethylated bead polymer, the total capacity of the aminomethylated bead polymer, the basicity yield and the results of the stability tests are summarized.

The following may be noted as additional information concerning the individual Comparitive Examples.

In Comparative Example $\alpha$, 20 minutes were required for the separation of the organic from the aqueous phase.

In Comparative Example $\beta$, the separation of the organic from the aqueous phase took 40 minutes.

In Comparative Example $\gamma$, even after 1 hour still no clear organic phase had separated. As a large portion of the bead polymers had been broken as soon as the amidomethylation was at an end, the saponification was omitted and the mixture was discarded.

EXAMPLE 2 a. The reaction was carried out as described in Example 1 except that 114.9 g of polymer B (particle size: 0.3–0.8 mm) were now used instead of polymer A used in Example 1. Yield of amidomethylated polymer: 690 ml. The 690 ml of amidomethylated bead polymer were saponified with 1380 ml of 27% strength by weight of sodium hydroxide solution. Yield 533 ml.

COMPARATIVE EXAMPLE $\alpha$

In Comparative Example $\alpha$, the reaction was carried out as described above for Example 2, with the only difference being that in step a. the pH of the reaction mixture was not adjusted to and maintained at 5.5 to 6.0 by adding sodium hydroxide solution, but 2.25 g of sodium carbonate were added once at the start of the reaction of phthalimide/formaldehyde.

In the Table following the Examples, the yields of amidomethylated and aminomethylated bead polymer, the total capacity of the aminomethylated bead polymer, the basicity yield and the results of the stability tests for the polymers obtained in Example 2 and in Comparative Example 2$\alpha$ are summarized.

EXAMPLE 3

The reaction is carried out as described in Example 1 except that 131.15 g of polymer C (particle size: 0.3–0.8 mm) were now used instead of polymer A used in Example 1. Yield of amidomethylated resin: 690 ml.

The 690 ml of amidomethylated bead polymer were saponified in 1380 ml of 27% strength by weight of sodium hydroxide solution under the conditions described in Example 1. Yield of aminomethylated bead polymer: 490 ml.

COMPARATIVE EXAMPLE α

In Comparative Example α, the reaction was carried out as above for Example 3, with the only difference being that in step a the pH of the reaction mixture was not adjusted to and maintained at 5.5–6.0 by adding sodium hydroxide solution, but 2.25 g of sodium carbonate were added once at the start of the reaction of the phthalimide/formaldehyde.

In the Table following the Examples, the yields of amidomethylated and aminomethylated bead polymers, the total capacities of the aminomethylated bead polymers, the basicity yields and the results of the stability tests for the polymers obtained in Example 3 and in Comparative Example 3α are summarized.

Explanations concerning the results of the stability tests listed in the Table below:

The symbols used denote:
O undamaged beads
⊕ fragmented beads
Δ fragments

In the first row of the stability tests, the condition of the beads before the stability test is described, in the second row the condition of the beads after the mechanical stress (roll test) and, in the third row, the condition of the beads after osmotic stress (swelling stability test).

solution in swelling agents in the presence of bases, (b) directly amidomethylating said polymers with N-hydroxymethylphthalimide prepared according to (a) in the presence of Friedel-Crafts catalysts and swelling agents and (c) finally saponifying the amidomethylated polymers to form the aminomethylated polymers, the improvement which comprises using in the first reaction step (a), as the base for producing N-hydroxymethylphthalimide a sodium hydroxide solution and adding this sodium hydroxide solution in such an amount and at such a rate that in the reaction mixture a pH-value is maintained in the range of 5 to 6, wherein the process improves the stability of the polymer.

2. The process of claim 1, wherein the swelling agent is 1,2-dichloroethane.

3. The process of claim 1, wherein an acetic acid ester of N-hydroxymethylphthalimide is the amidomethylating agent and sulphonic acid is the Friedel-Craft catalyst.

4. A process of claim 1, wherein the hydroxide solution is a 20 to 50% strength solution.

5. A process according to claim 1, which further comprises directly converting the N-hydroxymethylphthalimide from (a) to a bis(phthalimidomethyl) ether and directly amidomethylating said polymers with the bis(phthalimidomethyl) ether.

6. A process according to claim 1, which further comprises directly converting the N-hydroxymethylphthalimide from (a) to an ester of N-hydroxymethylph-

| Example | Base used | Amount of base or adjusted pH | Time required \|h\| for the formation of the bis(phthal-imidomethyl) ether | Yield \|ml\| in amido-methylated bead polymer | Yield \|ml\| in amino-methylated bead polymer | Total capacity \|val/l\| of amino-methylated bead polymer | Basicity yield \|val\| | Results of the stability tests O | ⊕ | Δ |
|---|---|---|---|---|---|---|---|---|---|---|
| 1 | NaOH | pH 5.6–6 | 1.5 | 600 | 437 | 2.61 | 1.141 | 99 | 0 | 1 |
|  |  |  |  |  |  |  |  | 98 | 0 | 2 |
|  |  |  |  |  |  |  |  | 98 | 1 | 1 |
| 1α | Na₂CO₃ | 2.25 g | 5.75 | 600 | 417 | 2.44 | 1.018 | 98 | 0 | 2 |
|  |  |  |  |  |  |  |  | 97 | 0 | 3 |
|  |  |  |  |  |  |  |  | 93 | 1 | 6 |
| 1β | Na₂CO₃ | 10.4 g | 6.75 | 575 | 388 | 2.42 | 0.939 | 97 | 1 | 2 |
|  |  |  |  |  |  |  |  | 96 | 1 | 3 |
|  |  |  |  |  |  |  |  | 92 | 2 | 6 |
| 1γ | Na₂CO₃ | 25.0 g | 6.00 | ~340 | — | — | — | — | — | — |
| 2 | NaOH | pH 5.5–6 | 1.5 | 690 | 533 | 2.26 | 1.204 | 99 | 0 | 1 |
|  |  |  |  |  |  |  |  | 97 | 0 | 3 |
|  |  |  |  |  |  |  |  | 99 | 0 | 1 |
| 2α | Na₂CO₃ | 2.25 g | 5.75 | 690 | 490 | 2.28 | 1.120 | 97 | 1 | 2 |
|  |  |  |  |  |  |  |  | 96 | 0 | 4 |
|  |  |  |  |  |  |  |  | 96 | 1 | 3 |
| 3 | NaOH | pH 5.5–6 | 1.5 | 690 | 490 | 2.45 | 1.203 | 99 | 0 | 1 |
|  |  |  |  |  |  |  |  | 97 | 0 | 3 |
|  |  |  |  |  |  |  |  | 98 | 1 | 1 |
| 3α | Na₂CO₃ | 2.25 g | 5.75 | 670 | 485 | 2.37 | 1.150 | 98 | 0 | 2 |
|  |  |  |  |  |  |  |  | 95 | 2 | 3 |
|  |  |  |  |  |  |  |  | 95 | 0 | 5 |

What is claimed is:

1. In the process for the preparation of anion exchangers based on crosslinked, water-insoluble organic polymers containing aromatic nuclei, which process comprises (a) producing N-hydroxymethylphthalmide by reaction of phthalimide with aqueous formaldehyde thalimide and directly amidomethylating said polymers with the ester of N-hydroxymethylphthalimide.

7. A process according to claim 5, wherein bis(phthalimidomethyl) ether is the amidomethylating agent and sulphuric trioxide is the Friedel-Craft catalyst.

* * * * *